(12) United States Patent
Studer et al.

(10) Patent No.: US 11,318,751 B2
(45) Date of Patent: May 3, 2022

(54) SENSOR CIRCUITRY

(71) Applicant: Hewlett-Packard Development Company, L.P., Spring, TX (US)

(72) Inventors: Anthony Donald Studer, Albany, OR (US); David Olsen, Corvallis, OR (US); Quinton Buford Weaver, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 16/768,607

(22) PCT Filed: Jul. 18, 2019

(86) PCT No.: PCT/US2019/042467
§ 371 (c)(1),
(2) Date: May 29, 2020

(87) PCT Pub. No.: WO2020/117324
PCT Pub. Date: Jun. 11, 2020

(65) Prior Publication Data
US 2021/0221145 A1  Jul. 22, 2021

(30) Foreign Application Priority Data

Dec. 3, 2018  (WO) ................ PCT/US2018/063624
Dec. 3, 2018  (WO) ................ PCT/US2018/063630
(Continued)

(51) Int. Cl.
*B41J 2/175*  (2006.01)

(52) U.S. Cl.
CPC ......... *B41J 2/17566* (2013.01); *B41J 2/1752* (2013.01); *B41J 2/1753* (2013.01);
(Continued)

(58) Field of Classification Search
CPC .... B41J 2/175; B41J 2/17503; B41J 2/17509; B41J 2/17513; B41J 2/1752;
(Continued)

(56) References Cited

U.S. PATENT DOCUMENTS

| 4,074,284 A | 2/1978 | Dexter et al. |
| 4,506,276 A | 3/1985 | Kyser et al. |

(Continued)

FOREIGN PATENT DOCUMENTS

| AU | 2014202104 A1 | 5/2014 |
| CA | 2507422 A1 | 1/2002 |

(Continued)

OTHER PUBLICATIONS

Arnostech, "Thermal Inkjet Printers," retrieved from http://www.arnostech.com/machines/coding-systems/thermal-inkjet-printers/, last retrieved on Jul. 1, 2019, 3 pages.
(Continued)

*Primary Examiner* — Anh T Vo
(74) *Attorney, Agent, or Firm* — Austin Rapp

(57) ABSTRACT

Examples of a print liquid supply unit are described herein. In some examples, the print liquid supply unit includes a regulator assembly. In some examples, the regulator assembly includes an at least partially expandable or contractible pressure chamber. In some examples, the print liquid supply unit includes a port. In some examples, the print liquid supply unit includes sensor circuitry positioned between the regulator assembly and the port in a print liquid reservoir.

19 Claims, 9 Drawing Sheets

(30) Foreign Application Priority Data

| Dec. 3, 2018 | (WO) | ................ PCT/US2018/063631 |
| Dec. 3, 2018 | (WO) | ................ PCT/US2018/063638 |
| Dec. 3, 2018 | (WO) | ................ PCT/US2018/063643 |
| Apr. 5, 2019 | (WO) | ................ PCT/US2019/026145 |

(52) U.S. Cl.
CPC ....... *B41J 2/17523* (2013.01); *B41J 2/17546* (2013.01); *B41J 2/17553* (2013.01)

(58) Field of Classification Search
CPC .. B41J 2/17523; B41J 2/1753; B41J 2/17546; B41J 2/17553; B41J 2/17566; B41J 2002/17516
See application file for complete search history.

(56) References Cited

U.S. PATENT DOCUMENTS

| 4,639,738 | A | 1/1987 | Young et al. |
| 4,734,787 | A | 3/1988 | Hayashi |
| 5,001,596 | A | 3/1991 | Hart |
| 5,045,811 | A | 9/1991 | Lewis |
| 5,079,570 | A | 1/1992 | Mohr et al. |
| 5,142,909 | A | 9/1992 | Baughman |
| 5,329,254 | A | 7/1994 | Takano |
| 5,438,351 | A | 8/1995 | Trenchard et al. |
| 5,471,176 | A | 11/1995 | James et al. |
| 5,583,544 | A | 12/1996 | Stamer et al. |
| 5,680,960 | A | 10/1997 | Keyes et al. |
| 5,682,184 | A | 10/1997 | Stephany et al. |
| 5,699,091 | A | 12/1997 | Bullock |
| 5,731,824 | A | 3/1998 | Kneezel et al. |
| 5,751,323 | A | 5/1998 | Swanson |
| 5,757,406 | A * | 5/1998 | Kaplinsky ................ B41J 2/175 347/87 |
| 5,777,646 | A * | 7/1998 | Barinaga .............. B41J 2/17513 347/86 |
| 5,788,388 | A | 8/1998 | Cowger et al. |
| 5,861,780 | A | 1/1999 | Fukuda |
| 5,975,688 | A | 11/1999 | Kanaya et al. |
| 6,068,363 | A | 5/2000 | Saito |
| 6,098,457 | A | 8/2000 | Poole |
| 6,151,039 | A | 11/2000 | Hmelar et al. |
| 6,164,766 | A | 12/2000 | Erickson |
| 6,175,929 | B1 | 1/2001 | Hsu et al. |
| 6,219,933 | B1 | 4/2001 | Taniguchi |
| 6,299,273 | B1 | 10/2001 | Anderson |
| 6,312,074 | B1 | 11/2001 | Walker |
| 6,341,853 | B1 | 1/2002 | Scheffelin et al. |
| 6,386,693 | B1 | 5/2002 | Michele |
| 6,402,299 | B1 | 6/2002 | DeMeerleer |
| 6,412,901 | B2 | 7/2002 | Su et al. |
| 6,431,670 | B1 | 8/2002 | Schantz et al. |
| 6,456,802 | B1 | 9/2002 | Phillips |
| 6,457,355 | B1 | 10/2002 | Philipp |
| 6,494,553 | B1 | 12/2002 | Donahue et al. |
| 6,494,568 | B2 | 12/2002 | Hou et al. |
| 6,598,963 | B1 | 7/2003 | Yamamoto et al. |
| 6,641,240 | B2 | 11/2003 | Hsu et al. |
| 6,641,243 | B2 | 11/2003 | Anderson et al. |
| 6,648,434 | B2 | 11/2003 | Walker et al. |
| 6,685,290 | B1 | 2/2004 | Farr et al. |
| 6,736,497 | B2 * | 5/2004 | Jung ................... B41J 2/17513 347/86 |
| 6,796,644 | B1 | 9/2004 | Anderson, Jr. et al. |
| 6,802,581 | B2 | 10/2004 | Hasseler et al. |
| 6,802,602 | B2 | 10/2004 | Sakai et al. |
| 6,811,250 | B2 | 11/2004 | Buchanan et al. |
| 6,902,256 | B2 | 6/2005 | Anderson et al. |
| 6,908,179 | B2 | 6/2005 | Pan et al. |
| 6,959,599 | B2 | 11/2005 | Feldstein et al. |
| 6,966,222 | B2 | 11/2005 | Carson et al. |
| 6,969,137 | B2 | 11/2005 | Maeda |
| 7,039,734 | B2 | 5/2006 | Sun et al. |
| 7,077,506 | B2 | 7/2006 | Chen |
| 7,171,323 | B2 | 1/2007 | Shipton et al. |
| 7,240,130 | B2 | 7/2007 | Larson |
| 7,260,662 | B2 | 8/2007 | Moriwaki et al. |
| 7,328,115 | B2 | 2/2008 | Shipton et al. |
| 7,380,042 | B2 | 5/2008 | Wang et al. |
| 7,458,656 | B2 | 12/2008 | Smith |
| 7,533,960 | B2 | 5/2009 | Yasuda et al. |
| 7,547,082 | B2 | 6/2009 | Lee et al. |
| 7,630,304 | B2 | 12/2009 | Larson et al. |
| 7,686,423 | B2 | 3/2010 | Sato et al. |
| 7,740,347 | B2 | 6/2010 | Silverbrook et al. |
| 7,775,638 | B2 | 8/2010 | Hirosawa et al. |
| 7,841,712 | B2 | 11/2010 | Muyskens et al. |
| 7,886,197 | B2 | 2/2011 | Wegman |
| 7,890,690 | B2 | 2/2011 | Naderi et al. |
| 7,970,042 | B2 | 6/2011 | Lexmark |
| 8,040,215 | B2 | 10/2011 | Zakriti |
| 8,161,224 | B2 | 4/2012 | Laurencin et al. |
| 8,215,018 | B2 | 7/2012 | Morita et al. |
| 8,220,910 | B2 | 7/2012 | Wanibe |
| 8,224,602 | B2 | 7/2012 | Lory et al. |
| 8,289,788 | B2 | 10/2012 | Asauchi |
| 8,331,581 | B2 | 12/2012 | Pennock |
| 8,348,377 | B2 | 1/2013 | Asauchi |
| 8,350,628 | B1 | 1/2013 | George et al. |
| 8,364,859 | B2 | 1/2013 | Sato |
| 8,386,657 | B2 | 2/2013 | Adkins et al. |
| 8,393,718 | B2 | 3/2013 | Kida et al. |
| 8,393,721 | B2 | 3/2013 | Katoh et al. |
| 8,429,437 | B2 | 4/2013 | Asauchi |
| 8,432,421 | B2 | 4/2013 | Muraki et al. |
| 8,438,919 | B2 | 5/2013 | Phillips et al. |
| 8,454,137 | B2 | 6/2013 | Price et al. |
| 8,556,394 | B2 | 10/2013 | Chen |
| 8,558,577 | B1 | 10/2013 | Soriano Fosas et al. |
| 8,562,091 | B2 | 10/2013 | Sabanovic et al. |
| 8,591,012 | B2 | 11/2013 | Yoshino et al. |
| 8,608,276 | B2 | 12/2013 | Oohashi et al. |
| 8,621,116 | B2 | 12/2013 | Fister et al. |
| 8,651,614 | B2 | 2/2014 | Sakamoto |
| 8,651,643 | B2 | 2/2014 | Harvey |
| 8,721,059 | B2 | 5/2014 | Kodama et al. |
| 8,721,203 | B2 | 5/2014 | Ehrhardt, Jr. |
| 8,752,943 | B2 * | 6/2014 | Hirano ................ B41J 2/17596 347/86 |
| 8,864,277 | B2 | 10/2014 | Rice et al. |
| 8,876,257 | B2 | 11/2014 | Harada et al. |
| 8,888,207 | B2 | 11/2014 | Furness, III |
| 8,892,798 | B2 | 11/2014 | Tailliet et al. |
| 8,898,358 | B2 | 11/2014 | DeCesaris et al. |
| 8,978,487 | B2 | 3/2015 | Fergusson et al. |
| 8,990,467 | B2 | 3/2015 | Saito |
| 9,079,414 | B2 | 7/2015 | Lester et al. |
| 9,108,448 | B1 | 8/2015 | Bergstedt |
| 9,132,656 | B2 | 9/2015 | Nicholson, III et al. |
| 9,137,093 | B1 | 9/2015 | Abraham |
| 9,176,921 | B2 | 11/2015 | Fister et al. |
| 9,194,734 | B2 | 11/2015 | Mehrer |
| 9,213,396 | B1 | 12/2015 | Booth et al. |
| 9,213,927 | B1 | 12/2015 | Ahne et al. |
| 9,254,661 | B2 | 2/2016 | Otaka et al. |
| 9,298,908 | B1 | 3/2016 | Booth et al. |
| 9,370,934 | B2 | 6/2016 | Asauchi et al. |
| 9,400,204 | B2 | 7/2016 | Schoenberg |
| 9,413,356 | B1 | 8/2016 | McKinley |
| 9,413,359 | B2 | 8/2016 | Stirk |
| 9,454,504 | B2 | 9/2016 | Evans |
| 9,483,003 | B2 | 11/2016 | Thacker, III |
| 9,487,017 | B2 | 11/2016 | Ge et al. |
| 9,496,884 | B1 | 11/2016 | Azenkot et al. |
| 9,511,596 | B2 | 12/2016 | Anderson et al. |
| 9,561,662 | B2 | 2/2017 | Ward et al. |
| 9,582,443 | B1 | 2/2017 | Switzer et al. |
| 9,599,500 | B2 | 3/2017 | Ge et al. |
| 9,619,663 | B2 | 4/2017 | Refstrup |
| 9,671,820 | B2 | 6/2017 | Maruyama et al. |
| 9,734,121 | B2 | 8/2017 | Pitigoi-Aron et al. |

(56) References Cited

U.S. PATENT DOCUMENTS

| | | |
|---|---|---|
| 9,738,087 B2 | 8/2017 | Kato |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,471,725 B2 * | 11/2019 | Esterberg ................. G01B 7/14 |
| 10,875,318 B1 | 12/2020 | Gardner |
| 10,894,423 B2 | 1/2021 | Gardner |
| 11,034,157 B2 | 6/2021 | Gardner |
| 2001/0029554 A1 | 10/2001 | Namba |
| 2001/0033316 A1 | 10/2001 | Eida |
| 2002/0012016 A1 * | 1/2002 | Wilson ..................... B41J 2/175 347/7 |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 * | 12/2004 | Naka ..................... B41J 2/17513 347/6 |
| 2005/0010910 A1 | 1/2005 | Lindhorst et al. |
| 2005/0093910 A1 | 5/2005 | Im |
| 2005/0125105 A1 | 6/2005 | Halstead |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi |
| 2007/0088816 A1 | 4/2007 | Hrustemovic et al. |
| 2007/0001153 A1 | 5/2007 | Smith |
| 2007/0115307 A1 | 5/2007 | Smith |
| 2007/0146409 A1 | 6/2007 | Kubota et al. |
| 2007/0247497 A1 | 10/2007 | Buchanan |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248028 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan |
| 2012/0284429 A1 | 11/2012 | Adkins et al. |
| 2012/0299989 A1 | 11/2012 | Prothon |
| 2013/0018513 A1 | 1/2013 | Ecobee |
| 2013/0054933 A1 | 2/2013 | Fister |
| 2013/0067015 A1 | 3/2013 | Vasters |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell |
| 2017/0100941 A1 | 4/2017 | Kuribayashi |
| 2017/0144448 A1 | 5/2017 | Smith |
| 2017/0157929 A1 | 6/2017 | Yokoo |
| 2017/0168976 A1 | 6/2017 | Yost et al. |
| 2017/0169623 A1 | 6/2017 | Chen |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |

(56) References Cited

U.S. PATENT DOCUMENTS

| | | |
|---|---|---|
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade |
| 2018/0281438 A1 | 10/2018 | Horade |
| 2018/0290457 A1 | 10/2018 | Ge |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson |
| 2019/0118527 A1 | 4/2019 | Anderson et al. |
| 2019/0126631 A1 | 5/2019 | Anderson et al. |
| 2019/0137316 A1 | 5/2019 | Anderson |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie |
| 2019/0240985 A1 | 8/2019 | Ge |
| 2020/0159689 A1 | 5/2020 | Koshisaka |
| 2021/0334392 A1 | 10/2021 | Panshin |

FOREIGN PATENT DOCUMENTS

| | | |
|---|---|---|
| CN | 2603934 | 2/2004 |
| CN | 2734479 | 10/2005 |
| CN | 201761148 | 3/2011 |
| CN | 102231054 | 11/2011 |
| CN | 203651218 U | 6/2014 |
| CN | 102736627 | 12/2014 |
| CN | 103879149 B | 6/2015 |
| CN | 105760318 A | 7/2016 |
| CN | 107209743 A | 9/2017 |
| CN | 108819486 | 11/2018 |
| CN | 209014461 U | 6/2019 |
| DE | 3712699 C2 | 3/1989 |
| EP | 0015954 A1 | 6/1984 |
| EP | 0720916 A2 | 7/1996 |
| EP | 1285764 | 2/2003 |
| EP | 0994779 B1 | 4/2003 |
| EP | 1314565 A2 | 5/2003 |
| EP | 1238811 B1 | 12/2006 |
| EP | 1800872 | 6/2007 |
| EP | 1389531 | 7/2007 |
| EP | 1164022 B1 | 7/2008 |
| EP | 1524120 B1 | 9/2008 |
| EP | 2237163 | 10/2010 |
| EP | 1839872 B1 | 11/2010 |
| EP | 2385468 | 11/2011 |
| EP | 2854063 | 6/2019 |
| EP | 3208736 | 12/2019 |
| GB | 2519181 | 4/2015 |
| JP | H04220353 | 8/1992 |
| JP | 2001292133 | 10/2001 |
| JP | 2002026471 A | 1/2002 |
| JP | 2003326726 | 11/2003 |
| JP | 2005262458 A | 9/2005 |
| JP | 2009258604 | 11/2009 |
| JP | 2010079199 | 4/2010 |
| JP | 2011113336 | 6/2011 |
| JP | 2012063770 | 3/2012 |
| JP | 2013197677 | 9/2013 |
| JP | 5644052 B2 | 12/2014 |
| JP | 2014534917 | 12/2014 |
| JP | 2016185664 | 10/2016 |
| JP | 2017196842 | 11/2017 |
| JP | 2018049141 | 3/2018 |
| JP | 2018136774 | 8/2018 |
| JP | 2018161785 | 10/2018 |
| JP | 2018531394 | 10/2018 |
| KR | 20080003539 A | 1/2008 |
| KR | 101785051 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2017174363 | 10/2007 |
| WO | WO-2008117194 A1 | 10/2008 |
| WO | WO-2009145774 A1 | 12/2009 |
| WO | WO-2012020443 | 2/2012 |
| WO | WO-2012054050 | 4/2012 |
| WO | WO2012054050 A1 | 4/2012 |
| WO | WO-2012057755 A1 | 5/2012 |
| WO | WO2013048430 A1 | 4/2013 |
| WO | WO-2015116092 | 8/2015 |
| WO | WO-2016061480 | 4/2016 |
| WO | WO-2016114759 | 7/2016 |
| WO | WO-2016130157 | 8/2016 |
| WO | WO-2013048430 | 5/2017 |
| WO | WO-2017074334 A1 | 5/2017 |
| WO | WO-2017074342 | 5/2017 |
| WO | WO-2017074342 A1 | 5/2017 |
| WO | WO-2017184147 A1 | 10/2017 |
| WO | WO-2017189009 | 11/2017 |
| WO | WO2017189009 A1 | 11/2017 |
| WO | WO-2017189010 A1 | 11/2017 |
| WO | WO2017189010 A1 | 11/2017 |
| WO | WO-2017189011 | 11/2017 |
| WO | WO2017189011 A1 | 11/2017 |
| WO | WO-2017189013 | 11/2017 |
| WO | WO-2018017066 | 1/2018 |
| WO | WO2018017066 A1 | 1/2018 |
| WO | WO-2018022038 | 2/2018 |
| WO | WO-2018186847 A1 | 10/2018 |
| WO | WO-2018199886 | 11/2018 |
| WO | WO-2018199891 | 11/2018 |
| WO | WO2018199891 A1 | 11/2018 |
| WO | WO-2018199895 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 | 4/2019 |
| WO | WO-2019078839 | 4/2019 |
| WO | WO-2019078840 | 4/2019 |
| WO | WO-2019078843 | 4/2019 |
| WO | WO-2019078844 | 4/2019 |
| WO | WO-2019078845 | 4/2019 |

OTHER PUBLICATIONS

Epson, "Epson provides rhe best inks for the job," retrieved from https://www.epson.co.nz/microsite/excellence/inks_why.asp, ast retrieved on Jul. 1, 2019, 3 pages.

HP, "Development of the HP DeskJet 1200C Print Cartridge Platform", Feb. 1994, 9 pages.

International Searching Authority "International Search Report and Written Opinion" issued in connection with PCT/U S2019/026159 dated Aug. 15, 2019, 15 pages.

International Searching Authority "International Search Report and Written Opinion" issued in connection with PCT/US2018/063624 dated Aug. 23, 2019, 13 pages.

International Searching Authority "International Search Report and Written Opinion" issued in connection with PCT/US2018/063630 dated Aug. 22, 2019, 15 pages.

International Searching Authority "International Search Report and Written Opinion" issued in connection with PCT/US2018/063633 dated Jul. 23, 2019, 12 pages.

International Searching Authority "International Search Report and Written Opinion" issued in connection with PCT/US2018/063638 dated Aug. 26, 2019, 13 pages.

International Searching Authority "International Search Report and Written Opinion" issued in connection with PCT/US2018/063643 dated Aug. 20, 2019, 13 pages.

(56) References Cited

OTHER PUBLICATIONS

International Searching Authority "International Search Report and Written Opinion" issued in connection with PCT/US2019/017511 dated Dec. 3, 2018, 12 pages.
International Searching Authority "International Search Report and Written Opinion" issued in connection with PCT/US2019/026124 dated Aug. 26, 2019, 15 pages.
International Searching Authority "International Search Report and Written Opinion" issued in connection with PCT/US2019/026133 dated Aug. 26, 2019, 18 pages.
International Searching Authority "International Search Report and Written Opinion" issued in connection with PCT/US2019/026145 dated Sep. 5, 2019, 16 pages.
International Searching Authority "International Search Report and Written Opinion" issued in connection with PCT/US2019/026161 dated Aug. 23, 2019, 20 pages.
International Searching Authority "International Search Report and Written Opinion" issued in connection with PCT/US2018/063631 dated Aug. 23, 2019, 13 pages.
Maxim Integrated Products "1-to-8 I2C Bus Switches/Multiplexers with Bus Lock-Up Detection, Isolation, and Notification" dated Sep. 2008, 22 pages.
NXP "Introducing A10006 Secure Authenticator Tamper-Resistant Anti Counterfeit Solution", last retrieved on Jul. 3, 2019, 29 pages.
NXP Semiconductors N.V. "NXP 2-, 4-, and 8-channel I2C/SMBus muxes and switches PCA954x" released Apr. 1, 2014, 34 pages.
NXP Semiconductors N.V. "PCA9641: 2-channel I2C-bus master arbiter Product data Sheet" released Oct. 23, 2014, 77 pages.
Open Source Multi-head 3D printer for polymer metal composite component manufacturing.
PCA954x I2C-bus multiplexer, Jul. 2008, NXP Semiconductors.
PCA9641 I2C arbiter, Oct. 2014, NXP Semiconductors.
Reddit, "Use an accelerometer to measure Z wobble", last retrieved on Jul. 1, 2019, https://www.reddit.com/r/Reprap/comments/6qsoyd/use_an_accelerometer_to_measure_z_wobble/ 3 pages.
The I2C-Bus Specification Version 2.1 Jan. 2000 (Year: 2000), 46 pages.
United States Patent and Trademark Office, "Non-Final office action ," issued in connection with U.S. Appl. No. 16/502,479, dated Dec. 11, 2019, 13 pages.
United States Patent and Trademark Office, "Non-Final Office action," issued in connection with U.S. Appl. No. 16/460,016, dated Sep. 12, 2019, 12 pages.
United States Patent and Trademark Office, "Non-Final Office action," issued in connection with U.S. Appl. No. 16/505,090, dated Sep. 10, 2019, 20 pages.
United States Patent and Trademark Office, "Notice of Allowance ," issued in connection with U.S. Appl. No. 16/502,479, dated Apr. 9, 2020, 9 pages.
United States Patent and Trademark Office, "Notice of allowance," issued in connection with U.S. Appl. No. 16/460,016, dated Mar. 25, 2020, 10 pages.
United States Patent and Trademark Office, "Notice of Allowance," issued in connection with U.S. Appl. No. 16/505,090, dated Feb. 12, 2020, 9 pages.
United States Patent and Trademark Office, "Notice of Allowance," issued in connection with U.S. Appl. No. 16/505,090, dated Oct. 22, 2019, 5 pages.
United States Patent and Trademark Office, "Notice of Allowance," issued in connection with U.S. Appl. No. 16/728,207, dated Feb. 19, 2020 19 pages.
United States Patent and Trademark Office, "Restriction Requirement," issued in connection with U.S. Appl. No. 16/502,479, dated Aug. 15, 2019 7 pages.

* cited by examiner

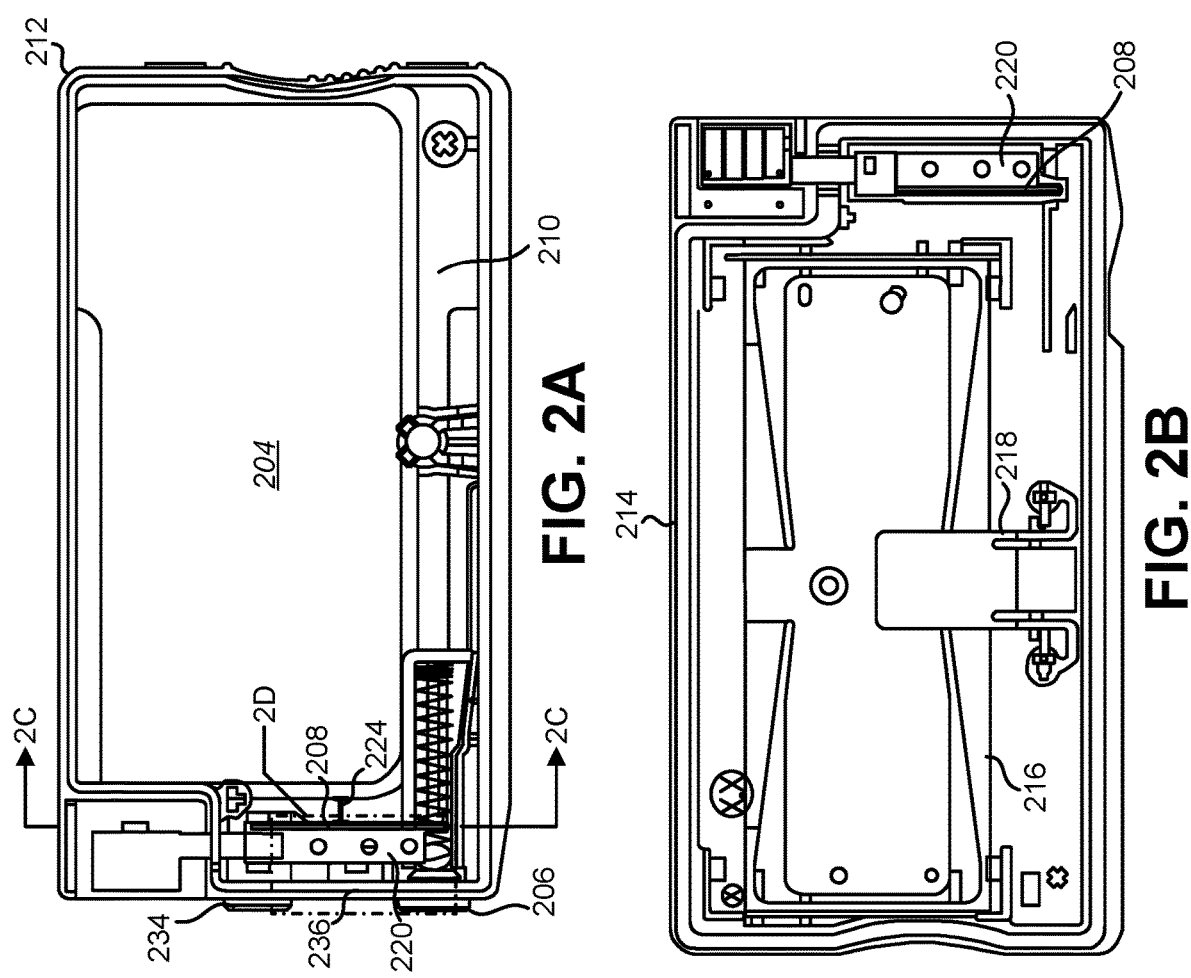

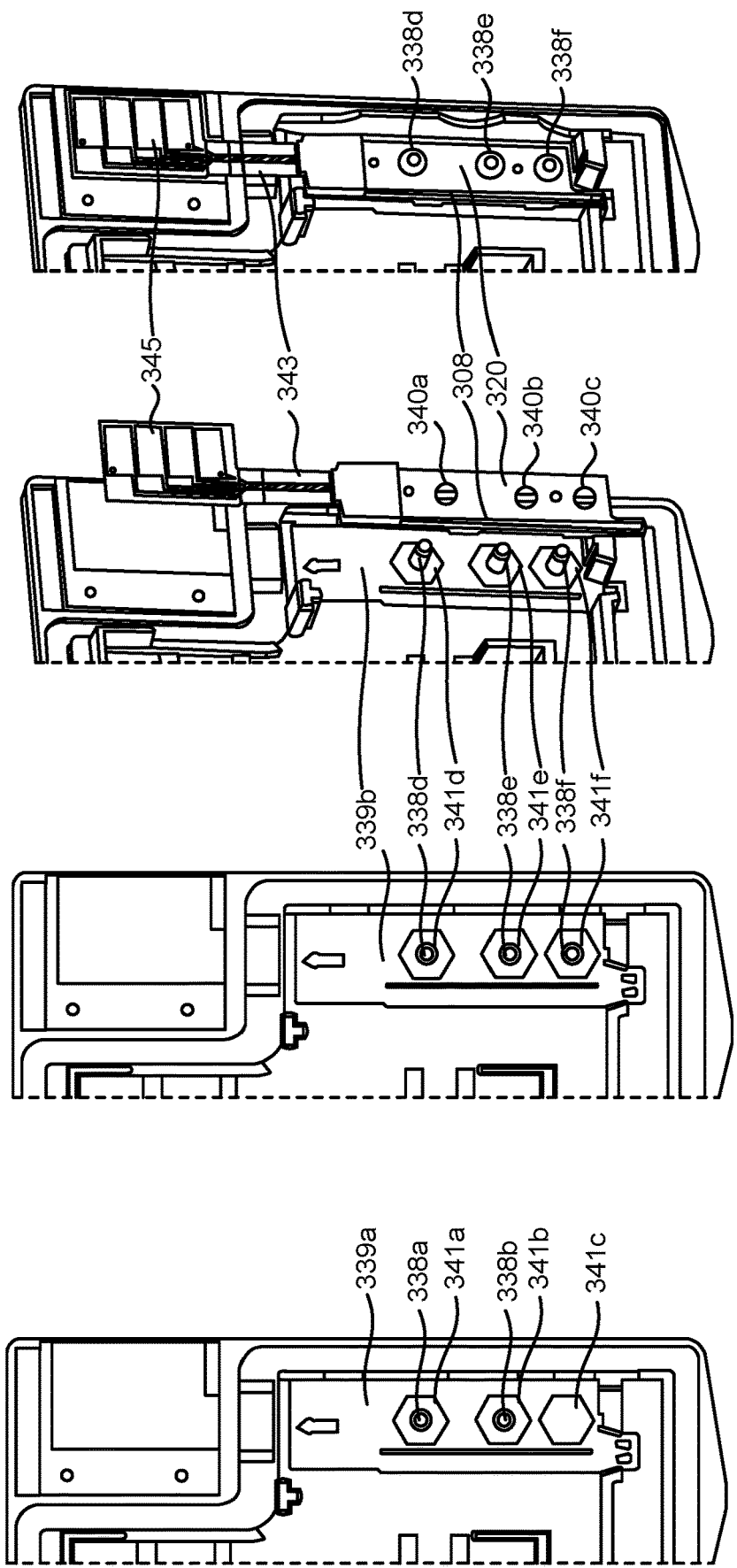

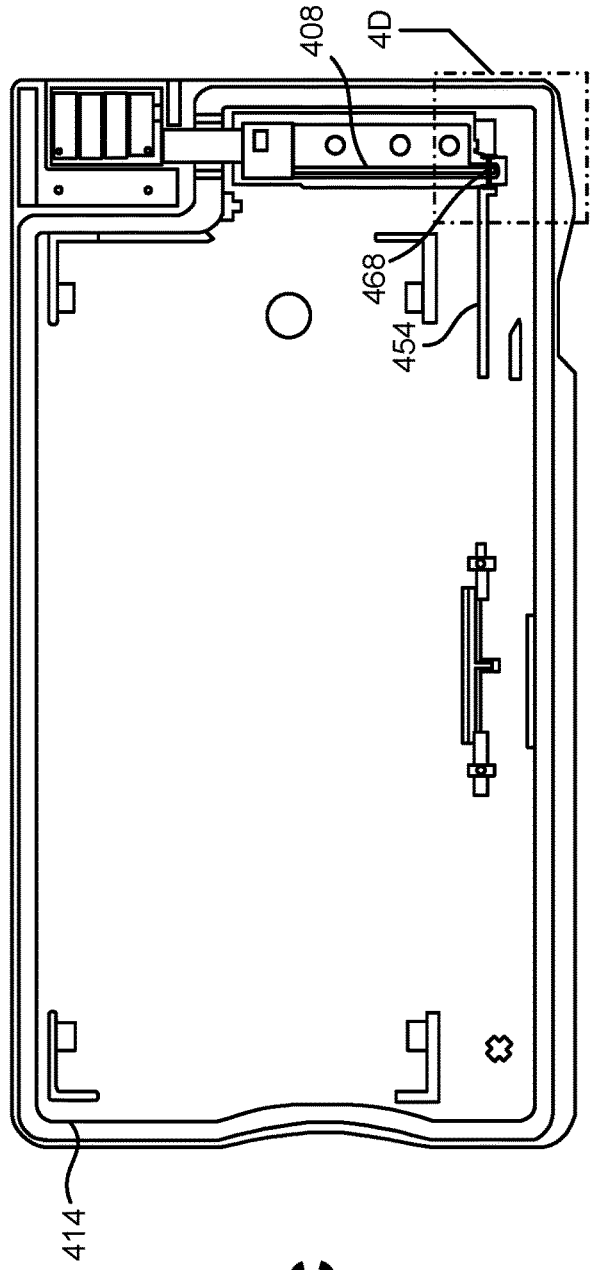
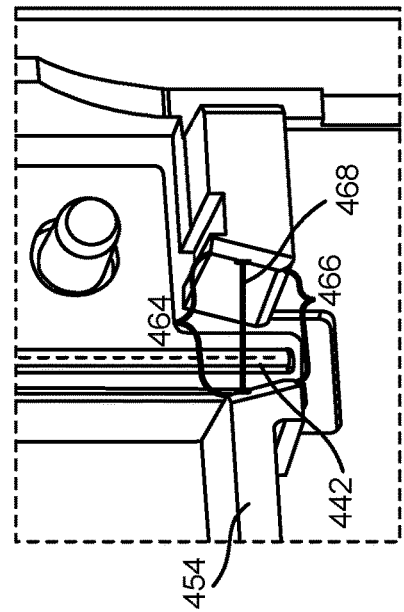
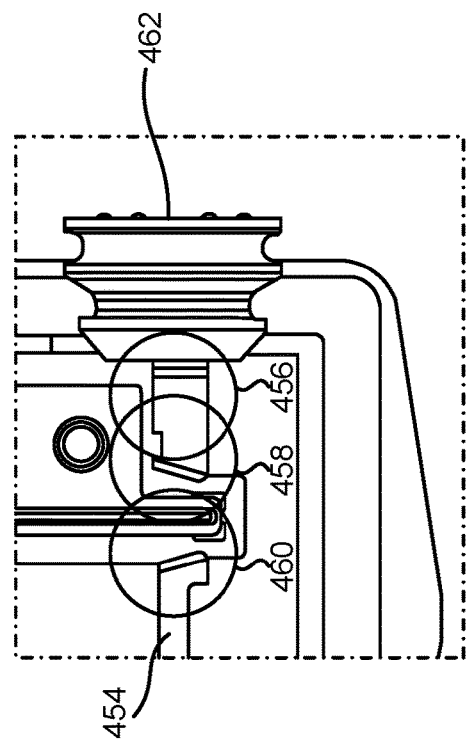
FIG. 4C
FIG. 4D
FIG. 4E

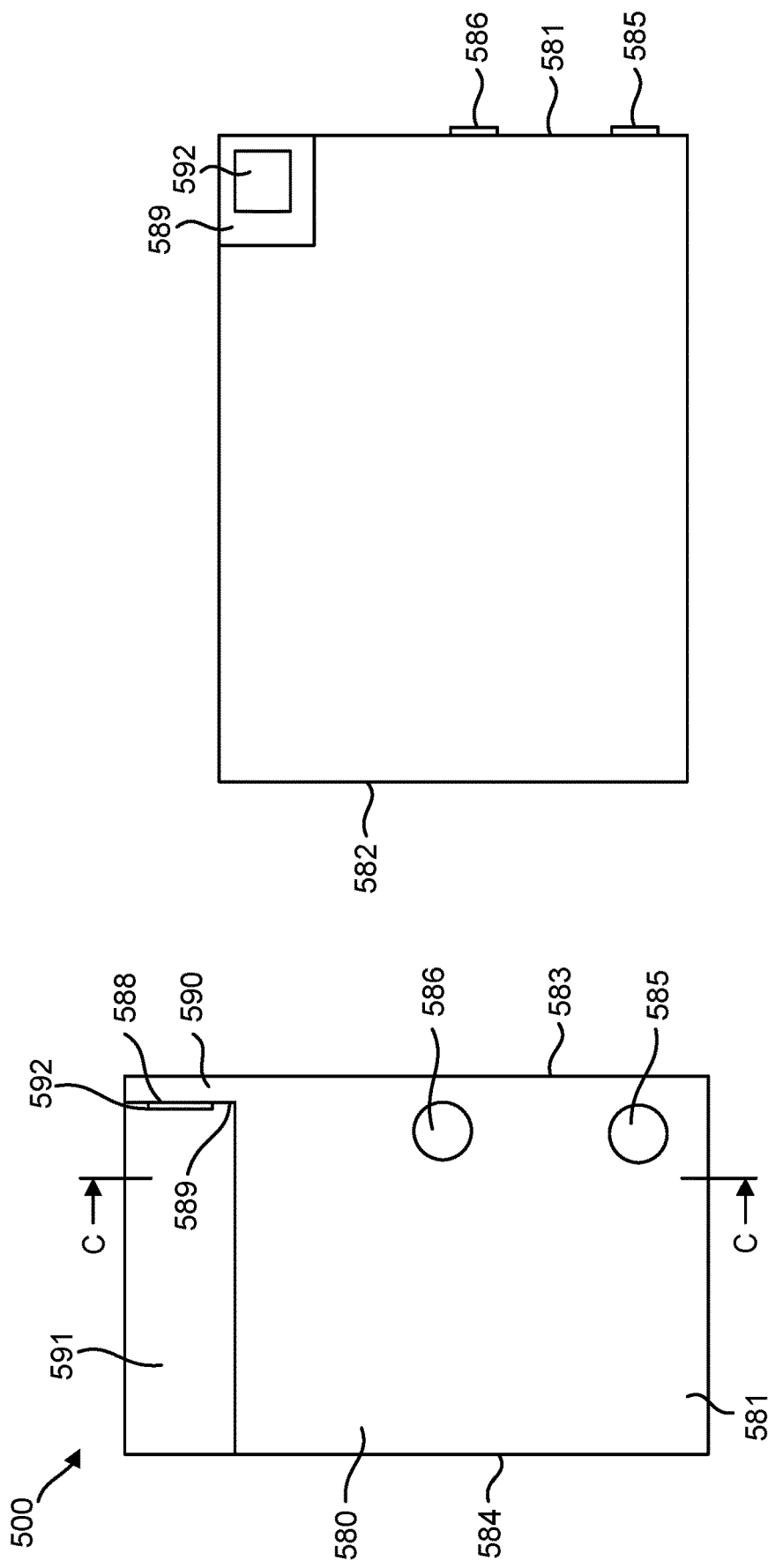

SENSOR CIRCUITRY

RELATED APPLICATIONS

This application is related to and claims priority to PCT International Application No. PCT/US2018/063643, filed Dec. 3, 2018, for "LOGIC CIRCUITRY," and to PCT International Application No. PCT/US2019/026145, filed Apr. 5, 2019, for "LOGIC CIRCUITRY," which claims priority to PCT International Application No. PCT/US2018/063631, filed Dec. 3, 2018, to International Application No. PCT/US2018/063624, filed Dec. 3, 2018, to International Application No. PCT/US2018/063630, filed Dec. 3, 2018, to International Application No. PCT/US2018/063638, filed Dec. 3, 2018, and to International Application No. PCT/US2018/063643, filed Dec. 3, 2018.

BACKGROUND

Some types of printing utilize liquid. For example, some types of printing extrude liquid onto media or material to produce a printed product (e.g., two-dimensional (2D) printed content, three-dimensional (3D) printed objects). In some examples, a print head may be utilized to extrude ink onto paper to print text and/or images. In some examples, a print head may be utilized to extrude fusing agent onto material in order to form a 3D printed object.

BRIEF DESCRIPTION OF THE DRAWINGS

FIG. 2A is a diagram illustrating an example of a body of a print liquid supply unit;

FIG. 2B is a diagram illustrating an example of a lid of a print liquid supply unit;

FIG. 2C is a cross sectional view of the example of the body illustrated in FIG. 2A;

FIG. 2D is an enlarged view of a portion of the example of the body 212 illustrated in FIG. 2A;

FIG. 3A is a diagram illustrating an example of a portion of a print liquid supply unit;

FIG. 3B is a diagram illustrating an example of a portion of a print liquid supply unit;

FIG. 3C is a perspective view diagram of an example of the portion of the print liquid supply unit described in connection with FIG. 3B;

FIG. 3D is a perspective view diagram of an example of the portion of the print liquid supply unit described in connection with FIG. 3B and FIG. 3C after attaching the sensor support;

FIG. 4C is a diagram of a lid of a print liquid supply unit;

FIG. 4D is a diagram illustrating an enlarged view of a portion of the example of the lid described in connection with FIG. 4C;

FIG. 4E is a diagram illustrating a perspective view of a portion of an example of the support rib described in connection with FIG. 4C and FIG. 4D;

FIG. 5 shows an example print liquid supply cartridge;

FIG. 6 is a cross-sectional view through the line C-C of the example print liquid supply cartridge of FIG. 5;

DETAILED DESCRIPTION

Figure 1:
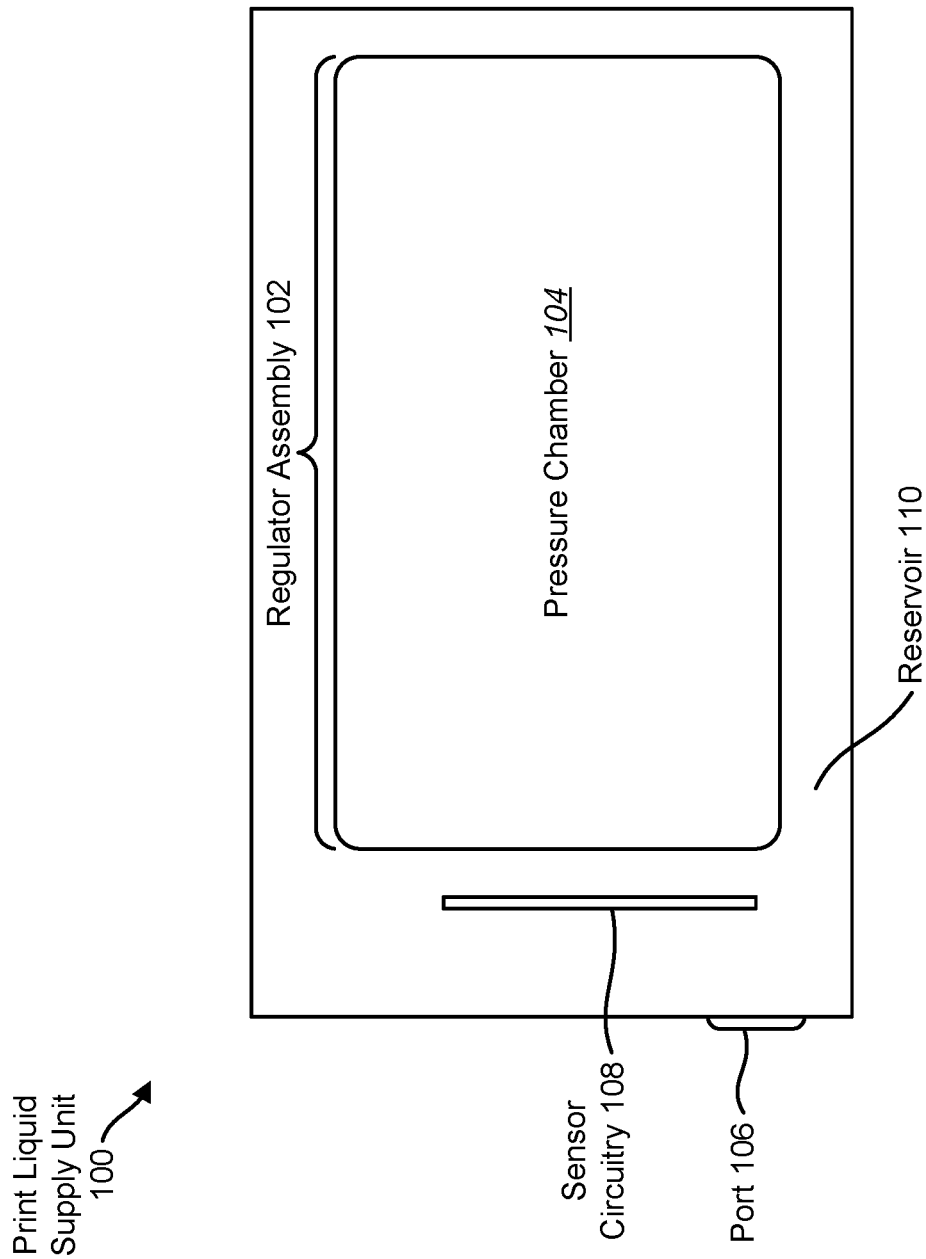
FIG. 1 is a diagram illustrating an example of a print liquid supply unit.

Some issues arise in the context of utilizing print liquid. Print liquid is a fluid for printing. Examples of print liquid include ink and fusing agent. In some examples, accurately sensing an amount of print liquid remaining in a reservoir may be difficult due to issues like liquid bridging, environmental conditions, and reduced water vapor transmission rates. An inaccurately sensed liquid level may lead to changing a print liquid supply unit more often, wasting print liquid, and/or increasing printing expense. Accordingly, it may be beneficial to provide more delivered print liquid, a more reliable sensed print liquid level, and/or less ink supply changes.

A sensor or sensors may be utilized to increase print liquid level sensing accuracy. The sensor(s) may be housed in a print liquid supply unit. A print liquid supply unit is a container that holds print liquid. In some examples, a print liquid supply unit may be referred to as a print liquid container, a cartridge, a supply, print liquid supply cartridge, etc. In some examples, the sensor(s) may be housed in a print liquid containing portion that may be referred to as a reservoir. In some examples, the sensor(s) may sense print liquid level and/or strain or pressure.

Some issues with sensing print liquid may include bridging. For example, because some print liquids include a surfactant or surfactants, the print liquids may tend to bridge between components in a print liquid container, which may reduce accuracy in sensing print liquid level. In some cases, it may be difficult to locate sensor(s) in a location of the print liquid container that can accurately measure low print liquid levels. In some examples, sensor(s) may be damaged through physical contact. For instance, another component or components that contact the sensor(s) may damage the sensor(s), which may reduce sensing accuracy and/or cause the sensor(s) to fail. In some cases, structural components of a print liquid container may interfere with placement of the sensor(s).

In some examples, four print liquid supply units may be utilized for a printer, which may include black, cyan, magenta, and yellow print liquid supplies. This may allow print liquid supplies with colors to be replaced individually. For example, a print liquid color that is used more often may be replaced individually without replacing remaining print liquid of another color or colors.

The print liquid may be supplied to a printer. For instance, the print liquid may be provided from the print liquid supply unit to a print head assembly. A print head assembly is a device that includes a print head to extrude the print liquid.

In some examples, print liquid supply units may be constructed of thermoplastics. Thermoplastics may be injection molded and may be compatible with high volume manufacturing and/or assembly methods. It may be beneficial for the construction materials (e.g., materials to construct components of the print liquid supply) to be compatible with the print liquid, to be robust to environmental conditions during shipping/handling, and/or to provide target water vapor transmission rates such that print quality is maintained over the life of the print liquid supply unit. In some examples, print liquid supply units may be constructed from thermoplastics such as polypropylene (PP), low-density polyethylene (LDPE), high-density polyethylene (HDPE), polyethylene terephthalate (PET), polycarbonate (PC), and/or blends thereof. Some thermoplastics may be compatible with high volume assembly methods such as ultrasonic welding, vibration welding, and/or laser welding. In some examples, welding (e.g., laser welding) may be capable of creating waterproof joint seals to contain the print liquid. As used herein, "welding," "weld," and variations thereof may denote laser welding, ultrasonic welding, and/or vibration welding. Examples of other approaches for joining components may include using adhesive.

Throughout the drawings, similar reference numbers may designate similar, but not necessarily identical, elements. Similar numbers may indicate similar elements. When an element is referred to without a reference number, this may refer to the element generally, without necessary limitation to any particular Figure. The figures are not necessarily to scale, and the size of some parts may be exaggerated to more clearly illustrate the example shown. Moreover the drawings provide examples and/or implementations in accordance with the description; however, the description is not limited to the examples and/or implementations provided in the drawings.

FIG. 1 is a diagram illustrating an example of a print liquid supply unit 100. Examples of the print liquid supply unit 100 include print liquid containers, cartridges, supplies, print liquid supply cartridges, etc. The print liquid supply unit 100 may contain and/or transfer print liquid (e.g., ink, agent, etc.). In some examples, the print liquid supply unit 100 may be designed to interface with a host device. A host device is a device that uses and/or applies print liquid. Examples of a host device include printers, ink jet printers, 3D printers, etc. For example, it may be beneficial to replenish or replace the print liquid supply unit 100 when some or all of the print liquid has been utilized.

In some examples, the print liquid supply unit 100 may include a regulator assembly 102. A regulator assembly 102 is a device to regulate pressure within the print liquid supply unit 100. The regulator assembly 102 may include a component or components. For example, the regulator assembly 102 may include a pressure chamber 104. The pressure chamber 104 is a structure that is at least partially expandable and/or collapsible. For example, the pressure chamber 104 may hold a gas (e.g., air) or fluid. In some examples, the pressure chamber 104 may expand when inflated and/or may collapse when deflated. Examples of the pressure chamber 104 and/or regulator assembly 102 may include a bag or balloon. In some examples, the regulator assembly 102 may include a spring and/or a lever. The spring and/or level may be utilized with the pressure chamber 104 (e.g., bag or balloon) to regulate the pressure in the print liquid supply unit 100. Another example of the pressure chamber 104 and/or regulator assembly 102 is a film on a structure (e.g., rib structure(s)) of the print liquid supply unit 100.

In some examples, the print liquid supply unit 100 may include a port 106. The port 106 is an opening in the print liquid supply unit 100. An example of the port 106 is a print liquid outlet. For example, the print liquid supply unit 100 may supply print liquid to a printer (e.g., print head) via the port 106.

In some examples, the print liquid supply unit 100 may include sensor circuitry 108. The sensor circuitry 108 is electronic circuitry to detect a condition or conditions. In some examples, the sensor circuitry 108 may include a liquid level sensor and/or a strain or pressure sensor. In some examples, the sensor circuitry 108 may be mounted on and/or in a sensor support. The sensor support is a structure that supports (e.g., carries) the sensor circuitry 108. In some examples, the sensor support may be a substrate or board. In some examples, the sensor support may be molded from a glass-filled engineering plastic for stability and to withstand a curing temperature to attach and protect all the components on the sensor support with adhesive. In some examples, the sensor circuitry 108 may be attached to the support with adhesive. The adhesive may be utilized for a portion of or a full length of the sensor circuitry 108. For example, adhesive may be applied to the sensor support. The sensor circuitry 108 may be placed on the adhesive, which may then be cured. In some examples, the sensor support may include a slot or slots to attach the sensor support and the sensor circuitry to the print liquid supply unit 100 (e.g., to a first housing component, to a lid, etc.).

In some examples, the sensor circuitry 108 may include a liquid level sensor (e.g., digital liquid level sensor) and/or a strain or pressure sensor. In some examples, measurements from the sensor circuitry 108 may be utilized to determine a print liquid level. In some examples, the sensor circuitry 108 (e.g., liquid level sensor) may include an array of heaters and thermal sensors. For example, the sensor circuitry 108 may activate the array of heaters and measure temperature at different levels. Lesser temperatures may correspond to heaters and/or thermal sensors that are below the print liquid level. Greater temperatures may correspond to heaters and/or thermal sensors that are above the print liquid level. The measured temperatures may indicate the level of the print liquid due to the different specific heats of print liquid and air.

In some examples, a liquid level sensor may span a full range of potential print liquid levels. For example, a liquid level sensor may extend from a bottom of the reservoir 110 to a top of the reservoir 110 to detect a full range of print liquid levels. In some examples, the liquid level sensor may span a partial range of potential print liquid levels. For example, the sensor circuitry 108 may detect a print liquid level for a portion of a level range of the print liquid reservoir 110. For example, the sensor circuitry 108 may detect print liquid levels that are 50% or less. Other ranges may be implemented (e.g., 90% or less, 75% or less, 60% or less, 30% or less, 25% or less, etc.). In some examples, multiple techniques may be utilized to measure print liquid level. For example, drop counting may be utilized to measure a print liquid level between 50% and 100%, while the sensor circuitry 108 (e.g., liquid level sensor) may measure a print liquid level between 0% and 100%.

In some examples, the sensor circuitry 108 may include a strain sensor or pressure sensor. For example, the sensor circuitry 108 may include a strain gauge or strain gauges, piezoelectric pressure sensor(s), electromagnetic pressure sensor(s), and/or capacitive pressure sensor(s), etc. For instance, the strain sensor or pressure sensor may provide measurements that indicate a change in resistance, inductance, and/or capacitance that corresponds to a strain or pressure. In some examples, the strain sensor or pressure sensor may measure a structural strain (e.g., deflection deformation of a wall of the print liquid supply unit 100) of the print liquid supply unit 100 and/or pressure in the reservoir 110.

In some examples, the sensor circuitry 108 may include a combination of a print liquid level sensor and a strain or pressure sensor. Accordingly, the sensor circuitry 108 may provide measurements that indicate a print liquid level and a strain or pressure of the print liquid supply unit 100.

In some examples, the sensor circuitry 108 may be positioned between the regulator assembly 102 and the port 106 in a print liquid reservoir 110. The print liquid reservoir 110 is a volume in the print liquid supply unit 100. The print liquid reservoir 110 may contain print liquid. The sensor circuitry 108 may be positioned between the regulator assembly 102 (e.g., pressure chamber 104) and the port 106 in order to provide improved measuring capability and/or to avoid contact with a structure or structure(s) that may damage the sensor circuitry 108. For example, positioning the sensor circuitry 108 by the port 106 may allow the print liquid level to be accurately measured when less than an amount (e.g., less than 100%, 60%, 50%, 40%, 30%, 20%, 10%, 5%, 2%, etc.) of print liquid remains in the print liquid supply unit 100. Positioning the sensor circuitry 108 at a distance from the regulator assembly 102 (e.g., pressure chamber 104) may avoid damaging the sensor circuitry 108 as the pressure chamber 104 expands and/or collapses. In some examples, the sensor circuitry 108 may be positioned in order to reduce and/or avoid bridging in the print liquid. For example, the sensor circuitry 108 may be distanced from the port 106 and/or the regulator assembly 102 (e.g., pressure chamber 104) in order to reduce bridging the print liquid between structures in the print liquid supply unit 100.

In some examples, the print liquid supply unit 100 may include a first housing component and a second housing component. The first housing component and the second housing component are structures for containing print liquid. For example, the first housing component may be joined to the second housing component to form the print liquid reservoir 110. In some examples, the first housing component and the second housing component may be made of a thermoplastic or a combination of thermoplastics. In some examples, the first housing component may be a lid of the print liquid supply unit and the second housing component may be a body of the print liquid supply unit 100. In some examples, the first housing component may be welded and/or joined to the second housing component along a supply joint. The supply joint is an interface between the first housing component and the second housing component. In some examples, the first housing component may be welded and/or joined to the second housing component using laser welding, ultrasonic welding, vibration welding, and/or adhesive.

In some examples, the sensor circuitry 108 may be coupled to a conductor or conductors. A conductor is a material that is able to conduct electricity or electrical signals. For example, a conductor may be a metal wire or ribbon. In some examples, a conductor may be overmolded with a protective material. The protective material may protect the conductor from contact with the print liquid, which may degrade the conductor. The conductor(s) may be routed from the inside of the print liquid supply unit 100 to the outside of the print liquid supply unit 100 through the supply joint or a wall of the print liquid supply unit 100. In some examples, the conductor may be coupled to an electrical interface (e.g., electrical connection pad(s)) on the outside of the print liquid supply unit 100. The electrical interface may be utilized to communicate with a printer in some examples.

FIG. 2A is a diagram illustrating an example of a body 212 of a print liquid supply unit. The body 212 may be an example of the second housing component described in connection with FIG. 1.

FIG. 2B is a diagram illustrating an example of a lid 214 of a print liquid supply unit. The lid 214 may be an example of the first housing component described in connection with FIG. 1.

FIG. 2C is a cross sectional view of the example of the body 212 illustrated in FIG. 2A. FIG. 2D is an enlarged view of a portion of the example of the body 212 illustrated in FIG. 2A. FIGS. 2A, 2B, 2C, and 2D will be described together for clarity.

In some examples, the body 212 and the lid 214 may be joined to form a print liquid supply unit (e.g., a print liquid container, a cartridge, print liquid supply cartridge, etc.). A reservoir 210 for print liquid may be enclosed when the body 212 and the lid 214 are joined. FIGS. 2A-D Illustrates examples of some components that may be internally housed in the print liquid supply unit.

In this example, a regulator assembly of the print liquid supply unit may include a pressure chamber 204 (e.g., a bag), a spring plate 216, and a lever 218. The regulator assembly may provide backpressure to the print liquid supply unit. In FIG. 2A, the pressure chamber 204 is illustrated inside the body 212, where some edges of the pressure chamber 204 (e.g., bag) may be folded along some edges of the body 212. Different shapes may be utilized for a pressure chamber, and/or a pressure chamber may change shape during operation. For example, the pressure chamber 204 may be shaped as an oblong oval in a stage of operation. In some examples, the spring plate 216 and/or lever 218 may be mounted to the lid 214. In some examples, the sensor circuitry 208 and/or sensor support structure 220 may be mounted to the lid 214. Other types of regulator assemblies may be utilized in some examples. For instance, other mechanical regulator assemblies and/or capillary media assemblies may be utilized with a reservoir 210 for the sensor circuitry 208. For example, the regulator assembly may be replaced with a block of foam in a similar position to work in a reservoir or ink chamber (with the sensor circuitry 208, for instance).

In some examples, the print liquid supply unit (e.g., the body 212) may include a port 206, a fill port 236, and/or an air interface port 234. The fill port 236 is a port for filling the print liquid supply unit with print liquid. The air interface port 234 is a port for inflating and/or deflating the pressure chamber 204. The port 206 may be utilized to supply print liquid. In the example illustrated in FIG. 2A, a rubber septum, a ball, and a spring are utilized to control port 206 access. In other examples, a port may include and/or utilize a split septum, or a film. In FIG. 2A and FIG. 2D, the sensor circuitry 208 and sensor support structure 220 are illustrated as being superimposed on the body 212 for clarity.

In some examples, the print liquid supply unit is filled through the fill port 236. A plug (e.g., plastic ball cork) may be utilized to close (e.g., seal) the fill port 236. Some (e.g., most) of the air remaining in the print liquid supply unit after filling with print liquid may be removed via the port 206. As the air is removed, an internal vacuum may be created that inflates the pressure chamber 204 (e.g., bag) while being resisted by the spring plate 216. The volume in the pressure chamber 204 may be sized to regulate (e.g., maintain) a pressure in a target range inside the print liquid supply unit during variations in temperature and/or altitude, and/or to prevent internal over-pressurization.

In some examples, when the print liquid supply unit is installed in a print head assembly, a first male needle interfaces with the port 206 and a second male needle interfaces with an air interface port 234. As print liquid is used and removed from the print liquid supply unit through the port 206, the pressure chamber 204 inflates and pushes on the lever 218 in the lid 214, which may open a port to allow air to bubble into the print liquid supply unit. The pressure chamber 204 may deflate accordingly to regulate the pressure in the print liquid supply unit. When the print liquid is exhausted from the print liquid supply unit (e.g., when most or all of the print liquid has been expelled), some air may be passed through the port 206 (e.g., through the first male needle) into the print head assembly.

In some examples, when a new print liquid supply unit is installed or when the print head is to be purged for servicing, an air pump in the printer may be used to inflate (e.g., hyper-inflate) the pressure chamber 204 through the air interface port 234. When the pressure chamber 204 is inflated to a degree, the lid 214 and/or the body 212 may deflect (e.g., bulge). For example, a wall of the lid 214 and/or a wall of the body 212 may deflect. In some examples, the pressure chamber 204 may be inflated to occupy more volume inside the print liquid supply, which may cause deflection. Inflating the pressure chamber 204 for a newly installed print liquid supply unit may force print liquid into the print head assembly to prime the print head while air is pushed into the print liquid supply unit.

In some examples, sensor circuitry may be attached to the print liquid supply unit. In the example illustrated in FIG. 2A and FIG. 2B, the sensor circuitry 208 and sensor support structure 220 are attached to the lid 214. When the deflection (e.g., bulge) occurs, the sensor circuitry 208 (e.g., strain gauge) may detect the deflection. For example, the sensor circuitry 208 may produce measurements that indicate the deflection. The measurements may be communicated to a printer in some examples. For example, strain and/or pressure sensors may be utilized to provide feedback. For instance, the sensor circuitry 208 may be utilized to verify that a regulator assembly and/or pressure chamber are functioning. In some examples, the sensor circuitry 208 may be utilized to determine if there is a leak in the print liquid supply unit.

As illustrated in FIG. 2A, the print liquid supply unit (e.g., regulator assembly, pressure chamber 204) may not provide an open vertical region at the back of the print liquid supply unit for sensor circuitry without potential mechanical interference between components. Print liquid may potentially bridge between components at the back of the print liquid supply unit. If sensor circuitry were located at the back of the print liquid supply unit, false measurements may potentially occur due to hydrodynamic liquid effects from the pressure chamber 204.

In some examples, sensor circuitry may include layers of sensors. For example, sensor circuitry may be manufactured using layers of silicon. In some examples, strain gauges may be located in a lower (e.g., bottom) layer, heaters may be located in a middle layer (e.g., a layer above the layer with the strain gauges), and thermal sensors may be located on an upper layer (e.g., on the face of the silicon). When the heaters are activated, the thermal sensors may detect the difference between the presence of air and print liquid, which may indicate the print liquid level. To accurately detect the level in the print liquid supply unit, it may be beneficial for the print liquid to drain off the sensor. The level of print liquid may be more difficult to detect compared to water, because the print liquid may include a surfactant or surfactants. A surfactant may reduce surface tension and/or may cause the print liquid to foam. In some examples, physical gaps between surfaces and/or components create capillary forces, which may allow the print liquid to bridge and not reliably drain. For these reasons, it may be beneficial to locate sensor circuitry (e.g., a vertical sensing array) in an open area of the print liquid supply unit. For example, an area with enough space to reduce or eliminate bridging may be beneficial. An area that provides (e.g., increases) print liquid drainage off of the sensor may be beneficial.

In some examples, sensor circuitry (e.g., the sensing face of the silicon) may be coated with a protective layer to prevent the sensor circuitry from becoming etched over time from being exposed to the print liquid. In some examples, the protective layer may be fragile. Accordingly, it may be beneficial to avoid contact between sensor circuitry and an internal component or components, such as a pressure chamber.

In the examples illustrated in FIGS. 2A-D, a frontal area of the print liquid supply unit includes internal features, surfaces, and components including the air interface port 234, the fill port 236, and the port 206. To reduce or eliminate bridging and/or to improve measurement accuracy, the sensor circuitry 208 is distanced from the air interface port 234, the fill port 236, and the port 206. The sensor circuitry 208 is distanced from the regulator assembly (e.g., the pressure chamber 204). In this example, a first distance 224 between the sensor circuitry 208 and the pressure chamber is approximately 3.2 millimeters (mm).

FIG. 2C illustrates a cross section along the line 2C, through the sensor circuitry 208, the body 212, and the lid 214. In some examples, the support structure 220 (e.g., substrate) and/or connections may extend along port features, while the sensor circuitry 208 may extend next to the port features. As illustrated in FIG. 2D, the sensor circuitry 208 may detect a print liquid level for a portion 222 of a level range of the reservoir 210. For instance, the sensor circuitry 208 may provide sensing for a level range that is approximately half of a maximum print liquid level and/or approximately half of the height of the reservoir 210. An example of a second distance 226 between the sensor circuitry 208 to an air interface port feature is approximately 3.8 mm. An example of a third distance 228 from the bottom of the sensor circuitry 208 to the bottom of the reservoir 210 is approximately 2 mm. An example of a fourth distance 230 from the sensor circuitry 208 to a back of a fill port feature is approximately 2 mm. An example of a fifth distance 232 from the sensor circuitry 208 to a port feature is approximately 4.8 mm. Different distances may be implemented. In some examples, the distances 224, 226, 228, 230, 232 may be greater than 1 mm, greater than 1.5 mm, greater than 2 mm, greater than 2.25 mm, or greater than another distance.

FIG. 3A is a diagram illustrating an example of a portion of a print liquid supply unit. The portion may be an example of a portion of the first housing component (e.g., a lid) described in connection with FIG. 1. In FIG. 3A, the print liquid supply unit (e.g., an interior side of a first housing component or lid) may include a recess 339a, raised surfaces 341a-c, and posts 338a-b. The raised surfaces 341a-c are protruding surfaces. A sensor support (not shown) may sit on the raised surfaces 341a-c. The recess 339a is a recessed area (e.g., an area in raised fences on three sides) in the inside of the print liquid supply unit (e.g., of a first housing component or lid). The raised surfaces 341a-c may protrude from the recess 339a to allow more deflection of the print liquid supply unit. Utilizing the raised surfaces 341a-c may reduce an amount of overall surface area to be controlled for flatness. The recess 339a and the raised surfaces 341a-c may facilitate print liquid drainage between the back of the sensor support and the print liquid supply unit (e.g., first housing component or lid). The posts 338a-b are protruding structures or columns for attaching the sensor support. In the example of FIG. 3A, the print liquid supply unit includes two posts 338a-b. Different numbers of raised surfaces and/or posts may be utilized. While round posts are shown in some of the Figures, posts of other shapes may be utilized in some examples.

The posts 338a-b may be swage posts. A swage post is a post that may be swaged to form the post into a shape. For example, once the sensor support is mounted onto the posts 338a-b, the posts 338a-b may be swaged to expand top portions of the posts 338a-b. The expanded portions of the posts 338a-b may act as keepers to attach the sensor support to the print liquid supply unit (e.g., a first housing component or lid). Accordingly, the print liquid supply unit may include a first post 338a and a second post 338b, where a sensor support is attached to the first post 338a and to the second post 338b.

FIG. 3B is a diagram illustrating an example of a portion of a print liquid supply unit. The portion may be an example of a portion of the first housing component (e.g., a lid) described in connection with FIG. 1. In FIG. 3B, the print liquid supply unit (e.g., an interior side of a first housing component or lid) may include a recess 339b, raised surfaces 341d-f, and posts 338d-f. The recess 339b, raised surfaces 341d-f, and/or posts 338d-f may be similar to corresponding elements described in connection with FIG. 3A. In the example of FIG. 3B, the print liquid supply unit may include a first post 338d, a second post 338e, and a third post 338f, where a sensor support a may be attached to the first post 338d, to the second post 338e, and to the third post 338f. From an assembly standpoint, it may be beneficial to utilize two posts 338a-b, as described in connection with FIG. 3A. For improving strain response and providing redundancy, it may be beneficial to utilize three posts 338d-f or more.

FIG. 3C is a perspective view diagram of an example of the portion of the print liquid supply unit described in connection with FIG. 3B. FIG. 3C also includes an example of a sensor support 320, electrical connector 343, and electrical pads 345 before mounting the sensor support 320. For example, the print liquid supply unit may include a first post 338d, a second post 338e, and a third post 338f, where the first post 338d, second post 338e, and third post 338f are situated in slots 340a-c of the sensor support 320. When mounted, the sensor support 320 may sit on the raised surfaces 341d-f.

FIG. 3D is a perspective view diagram of an example of the portion of the print liquid supply unit described in connection with FIG. 3B and FIG. 3C after attaching the sensor support 320. In some examples, once the sensor support is mounted onto the posts 338d-f, the posts 338d-f may be swaged to expand top portions of the posts 338d-f. The expanded portions of the posts 338d-f may act as keepers to attach the sensor support 320 to the print liquid supply unit (e.g., a first housing component or lid).

In the example of FIG. 3D, a round swaging shape is shown. Other various shapes may be employed (e.g., elongated vertical or horizontal ovals or different combinations). In other examples, other features may be implemented to swage over and attach the sensor support 320 to the print liquid supply unit (e.g., first housing component or lid). For instance, features along the edges of the sensor support 320 may be swaged over to attach the sensor support 320.

When the print liquid supply unit is deflected by the regulator assembly, the sensor circuitry 308 may deflect. In some examples, the sensor circuitry 308 may detect the deflection. For example, the sensor circuitry 308 may include strain gauges to measure the deflection. In some examples, the majority of the deflection may occur in a region of the print liquid supply unit where the pressure chamber is located. In some examples, an increasing gradient of deflection may occur from top-to-bottom, with more deflection in the middle. In some examples, the highest deflection on the sensor circuitry may be next to the top post 338d, with less deflection near the middle post 338e and very little or none near the bottom post 338f. In some examples, more than two attachment points (e.g., posts) may be beneficial for redundancy for scenarios where one post does not get swaged tightly, or if one post is damaged or undersized. More than two attachment points may beneficially allow for tuning a response of the sensor circuitry 308 based on an expected pattern.

Attaching a sensor support and/or sensor to the print liquid supply unit using cold, warm, or hot swaging may provide some benefits compared to other assembly methods. For example, the print liquid supply unit and sensor support may be manufactured from materials that are compatible with swaging. Some examples of swaging may provide benefits, such as being low-cost, space efficient, and/or not utilizing additional joining materials or components. Any positive number of (e.g., 1 to n) mechanical attachment points (e.g., posts or swaging points) between the print liquid supply unit (e.g., first housing component or lid) and the sensor support may be located based on deflection zones during a hyperinflation event. For example, the sensor support may have 1 to n number of holes that may be mounted on 1 to n number of corresponding male posts on the print liquid supply unit.

The sensor support may be attached by cold forming, warm forming, or heat swaging the ends of the posts to effectively create a retaining head. This approach may work in examples where the print liquid supply unit (e.g., lid) is constructed with thermoplastics (such as Polypropylene (PP) or High-Density Polyethylene (HDPE)) that can be injection molded and are compatible with high volume manufacturing and/or assembly techniques. Some thermoplastic materials are also compatible with the print liquid, robust to environmental conditions during shipping/handling, and/or may provide acceptable Water-Vapor-Transmission-Rates (WVTR). This may ensure that the print quality is not degraded over the life of the print liquid supply unit.

In some examples, the sensor support may be constructed from an engineering plastic that can withstand high temperatures used for curing adhesives that may be utilized to assemble the print liquid supply unit. For instance, the sensor support may be suitable to withstand the cold, warm, or hot swaging of the posts, where the melting temperature/strength of the print liquid supply unit (e.g., body and/or lid) material is lower. In some examples, utilizing swaging to attach components may be beneficial because components (e.g., plastic parts) may be joined by forming features from the print liquid supply unit material, rather than having to introduce another material (e.g., bonding agent) or additional parts.

In some examples, a print liquid container may include a container wall. For example, the portions of a print liquid supply unit described in connection with FIGS. 3A, 3B, 3C, and/or 3D may be examples of container walls. A container wall may include posts (e.g., posts 338a-b, posts 338d-f, or other posts). The print liquid container may include a container property sensor. The container property sensor is a sensor to detect a property or properties of the container (e.g., strain, deflection, pressure, print liquid level, etc.). In some examples, the container property sensor may include a strain sensor or pressure sensor secured to the container wall with the posts. The container property sensor may be an example of the sensor circuitry or circuitries described herein. For example, the container property sensor may include a strain sensor or strain sensors, a pressure sensor or pressure sensors, and/or a print liquid level sensor or print liquid level sensors. The posts may be swaged to secure the container property sensor to the container wall. For example, the container property sensor may include slots or may be mounted on a sensor support that includes slots corresponding to the posts. When the posts are situated through the slots, the posts may be swaged (e.g., cold, warm, or hot swaged) to secure the container property sensor to the container wall.

Figure 4A:
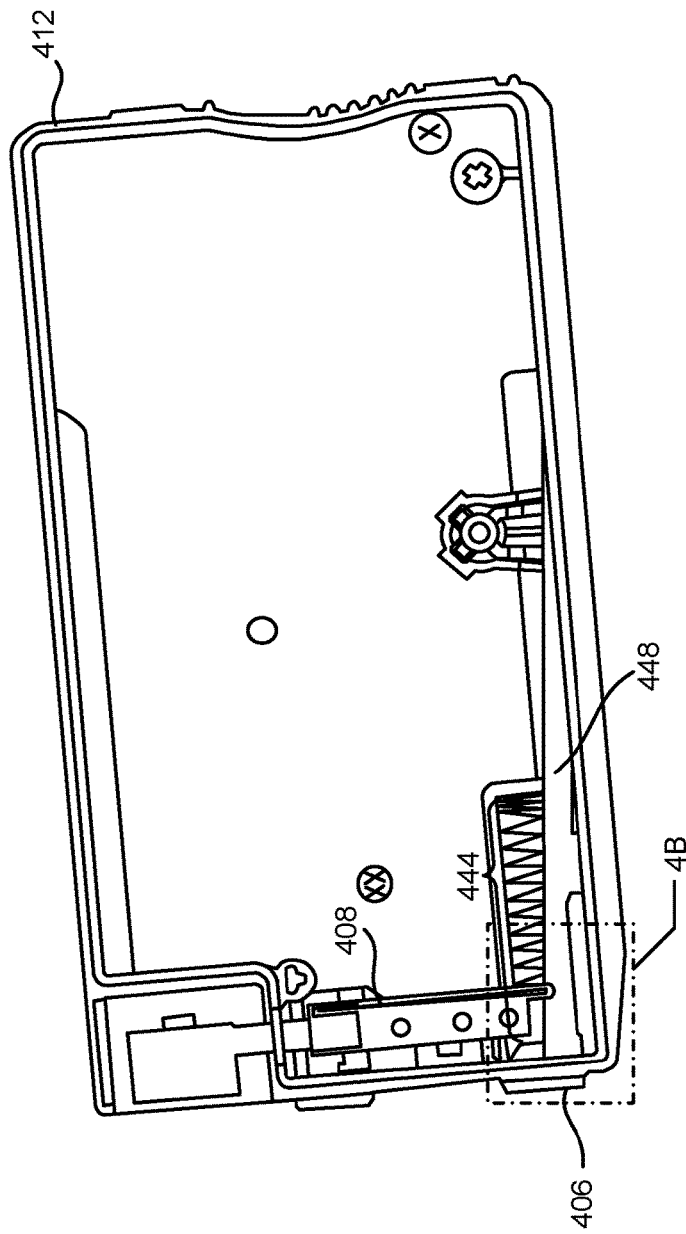
FIG. 4A is a diagram illustrating an example of a body of a print liquid supply unit.

FIG. 4A is a diagram illustrating an example of a body 412 of a print liquid supply unit. In some examples, the body 412 described in connection with FIG. 4A may be an example of the second housing component of the print liquid supply unit described in connection with FIG. 1. In this example, the body 412 includes a port 406. The body 412 also includes a valve mechanism 444 to open or close the port 406. In some examples, the print liquid supply unit may be coupled to a printer in an angled position (e.g., tilted by 5 degrees), such that print liquid 448 may drain towards the port 406. Sensor circuitry 408 is also illustrated in relation to the body 412. In some examples, the sensor circuitry 408 may be mounted to a lid.

Figure 4B:
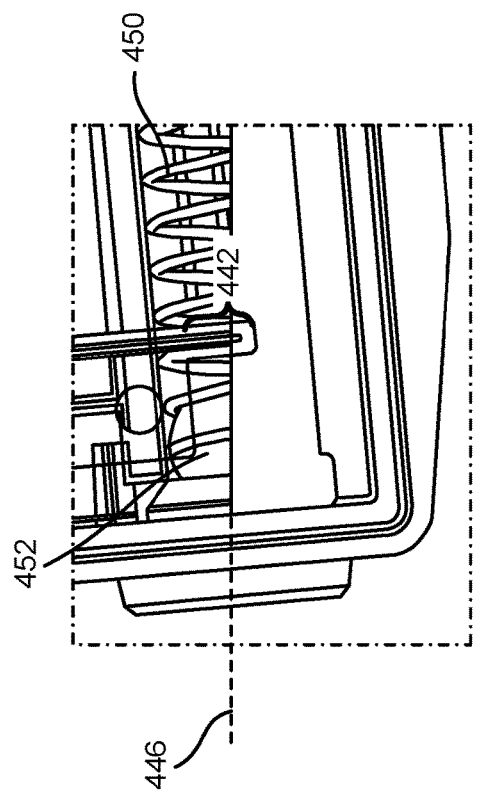
FIG. 4B is a diagram illustrating an enlarged view of a portion of the body described in connection with FIG. 4A.

FIG. 4B is a diagram illustrating an enlarged view of a portion of the body 412 described in connection with FIG. 4A. It may be beneficial to sense a print liquid 448 level accurately when the print liquid 448 level is low or nearly exhausted. For example, when the top of the print liquid 448 is at the center line, the print liquid supply unit may be considered to be empty. In order to achieve accurate print liquid level sensing at low levels, the sensor circuitry 408 may extend near to the bottom of the reservoir. A portion 442 of the sensor circuitry 408 may reach to a port 406 center line 446 or lower.

In some examples, the valve mechanism 444 may include a spring 450 and a ball 452. Some examples of the print liquid supply units described herein may allow the portion 442 of the sensor circuitry 408 to extend into a region where the valve mechanism 444 is located.

FIG. 4C is a diagram of a lid 414 of a print liquid supply unit. The lid 414 may be joined with the body 412 described in connection with FIGS. 4A and 4B to form the print liquid supply unit in some examples. The lid 414 may include the sensor 408 (e.g., print liquid level sensor and/or strain or pressure sensor).

The lid 414 may include a support rib 454. The support rib 454 is a structure to support the valve mechanism 444. For example, the support rib 454 may retain and/or guide the valve mechanism 444. For instance, the support rib 454 may retain the spring 450 and/or the ball 452 as the valve mechanism 444 opens and/or closes. The support rib 454 may include a slot 468. The slot 468 is an opening in the support rib 454. The portion 442 of the sensor circuitry 408 may be situated through the slot 468.

FIG. 4D is a diagram illustrating an enlarged view of a portion of the example of the lid 414 described in connection with FIG. 4C. A septum 462 is also illustrated. In some examples, the septum 462 may be situated in the port 406. The example of FIG. 4D illustrates travel positions of the ball 452 of the valve mechanism. When the ball 452 is inserted (e.g., pressed, sealed, etc.) into the port 406 and/or septum 462, the ball 452 may be in a closed position 456. The ball 452 may be in the closed position 456 when the print liquid supply unit is not installed. When in an installed position 458, the ball 452 may be situated away from the port 406 and/or septum such that the port 406 is open. For example, a needle may be inserted into the port 406 (e.g., septum 462), which may press the ball 452 into the installed position 458 when the print liquid supply unit is installed in a print head assembly. An overtravel position 460 is also illustrated, where the ball 452 is pressed beyond the installed position 458. The overtravel position 460 may occur during installation when the ball reaches the overtravel position before the print liquid supply unit is latched in the print head assembly. The support rib 454 may retain the valve mechanism 444 (e.g., ball 452 and/or spring 450) as the valve mechanism travels during installation and/or removal. The slot 468 may be sized (e.g., less than the size of the ball 452, less than a diameter of the ball 452, etc.) such that the ball 452 can travel along the support rib 454 without falling into the slot 468. In some examples, the ball 452 may be approximately 4 mm in diameter. For example, the ball 452 may be larger than the slot 468 so that the ball 452 cannot fall into the opening while the support rib 454 provides support.

FIG. 4E is a diagram illustrating a perspective view of a portion of an example of the support rib 454 described in connection with FIG. 4C and FIG. 4D. In this example, the slot 468 has a shape to create a first capillary force at a first end 466 of the slot 468 that is greater than a second capillary force at a second end 464 of the slot. For instance, the slot 468 for the sensor portion 442 may have two tapered edges instead of simple vertical walls in some examples. The tapered edges may act as capillary draws to help print liquid drain off the lower sensor portion 442. As the edges get closer to the sides of the sensor support, there may be higher capillary forces compared to the greater distance at the top. In other examples, vertical walls or other shapes may be implemented in the slot 468.

In some examples, the support rib 454 may be taller than the sensor circuitry. This may provide protection for the lower sensor portion 442 (e.g., tail) during installation of the spring 450, ball 452, and septum, and/or during operation of the valve mechanism 444.

While some examples of the support rib 454 near the bottom of the print liquid supply unit have been described, the support rib 454 or another rib(s) may be located at other positions. For example, the width of the sensor circuitry 408 may allow local narrowing of the sensor support at various positions along the length of the sensor support. Accordingly, other designs may be utilized that accommodate a rib or ribs on the lid side of the print liquid supply unit.

In some examples, the body 412 and the lid 414 may be components of a cartridge. The cartridge may be an example of the print liquid supply unit described in connection with FIG. 1. For example, the cartridge may include a body 412 that includes a print liquid port. The print liquid port is a port to supply print liquid. The print liquid port may be an example of the port 406. A spring 450 may press a ball 452 into the print liquid port when in a closed position. The lid 414 may include a structure (e.g., support rib 454) to retain the spring 450 and the ball 452. The structure may include an opening (e.g., slot 468). In some examples, the cartridge may include sensor circuitry 408. A tail (e.g., portion 442) of the sensor circuitry 408 may be situated in the opening to sense a print liquid level by the print liquid port. The opening may have a first dimension (e.g., top dimension) that is greater than a second dimension (e.g., bottom dimension) of the opening. While an example of a slot 468 with a tapered shape is illustrated, the slot 468 may be shaped differently in other examples.

In some examples, the structure may be a protruding wall or rib on the lid to support the ball 452 and spring 450 to ensure that the valve mechanism 444 opens and closes properly when installed or removed from a print head assembly. As described above, it may be beneficial to have sensor circuitry 408 that extends downward to approximately the center line of the port 406. The cartridge may be deemed empty (e.g., out of ink (OOI)) when the print liquid 448 is at or below the center line 446. In some examples, a sensor support width (e.g., 1.2 mm) may be reduced near the bottom of the sensor support such that the structure (on the lid side, for example) can have an opening less than a size or length such that the ball cannot fall into the opening. In some examples, the sensing circuitry 408 may be narrow (e.g., <0.5 mm) to fit through an opening in the structure. In some examples a tapered opening shape may be utilized that creates higher capillary forces at the bottom to draw print liquid away from the sensor circuitry 408 and provide a more accurate measurement at the bottom.

In some examples, the print liquid port may include open hole rubber septum, plastic sealing ball, and a compression spring. When the cartridge is installed in a print head assembly, a male plastic needle may interface with the septum to seal the exterior to the rubber septum and push the ball into the cartridge and compress the spring. This may allow print liquid to flow from the cartridge to the print head assembly. In some examples, the septum, ball, and spring may be loaded from the front of the cartridge during installation. For example, the spring, ball, and septum may be installed from the front of the cartridge and retained by radial interference features on the septum and body. In some examples, structures (e.g., support rib, protruding structure(s)) may be located on the body and lid that provide support and/or guidance to both sides of the ball and spring assembly to ensure proper opening and closing when installed and removed from the print head assembly. Without the structures, the spring may potentially bend sideways, which may allow the ball to potentially stay in an open position, which may cause the cartridge to leak when it is removed from the print head assembly.

In some examples, other components (e.g., regulator assembly components) may be installed from a side of the cartridge. Accordingly, the body 412 may be molded from a side and closed with the lid 414. This allows an integrally molded housing for the ball and spring on the top, bottom, and back. In some examples, a structure (e.g., support rib) may be implemented on the body side.

FIG. 5 shows an example print liquid supply cartridge 500. In some examples, the print liquid supply cartridge 500 may be an example of the print liquid supply unit 100 described in connection with FIG. 1, an example of the print liquid container(s) described herein, and/or an example of the cartridge(s) described herein. In some examples, a component or components (e.g., body, lid) described herein may be implemented with the print liquid supply cartridge 500. More particularly, FIG. 5 shows an elevation view of the example cartridge 500. The cartridge 500 has a housing 580 which encloses an internal volume in which the print liquid, such as ink or agent, can be stored. The internal volume of the example cartridges described herein may be between approximately 10 milliliters to approximately 50 or approximately 100 milliliters. The housing 580 has a front end 581, a rear end 582 and first and second sides 583, 584 extending from the front end to the rear end. The front end 581 and the rear end 582 can be seen also in FIG. 6, which is a cross-sectional view through the line C-C of the example print liquid supply cartridge of FIG. 5. The housing 580 may comprise two relatively hard plastic shells which directly contain the print liquid therebetween. In the example, the height of the housing is greater than the width of the housing. Similarly, the height of the internal volume is greater than the width of the internal volume. The height of the internal volume may be defined by the height of the first and second sides and the width of the internal volume may be defined by the distance between the first and second sides.

The front end 581 may have a print liquid outlet 585 through which the print liquid can be supplied to a printer, for example by insertion of a fluid pen of the printer therein. The print liquid outlet 585 may be provided closer to the bottom than to the top of the front end 581.

A gas inlet 586 may be provided on the front end 581 also, to enable gas such as air to be supplied to the cartridge, for example by insertion of a fluid pen of the printer therein. The gas inlet 586 may be positioned above the print liquid outlet 585.

A first wall 588 having an internal side 589 and an external side 590 may be provided to delimit a recess 591. In the example shown, the recess 591 extends from the first wall 588 across the entire width of the front end 581. The first wall 588 thus overhangs a notched corner of the housing. The external side 590 of the first wall 588 may be part of the first side 583 of the housing 580. Electrical connection pads 592 are exposed on the internal side of the first wall, as shown also in FIG. 6. The electrical connection pads 592 are indicated by a single block in FIGS. 5 and 6. In one example, there are three electrical connection pads, although fewer or more connection pads may be provided. The electrical connection pads may be arranged in a top to bottom direction. The electrical connection pads enable electrical signals to be communicated between electrical circuitry of the cartridge and electrical circuitry of the printer, for example in accordance with an inter-integrated circuit (I2C) data communication protocol. Hence, the connection pads may form an I2C data interface. Providing the electrical connection pads 592 to the first wall 588 allows for easy mounting of the electrical connection pads 592 on the cartridge. Being positioned on the internal side 589, the electrical connection pads 592 are protected from damage when shipping and handling the cartridge. The recess 591 can receive an electrical connector of a printer to establish an electrical connection between the electrical connection pads 592 and the electrical connector.

Figure 7:
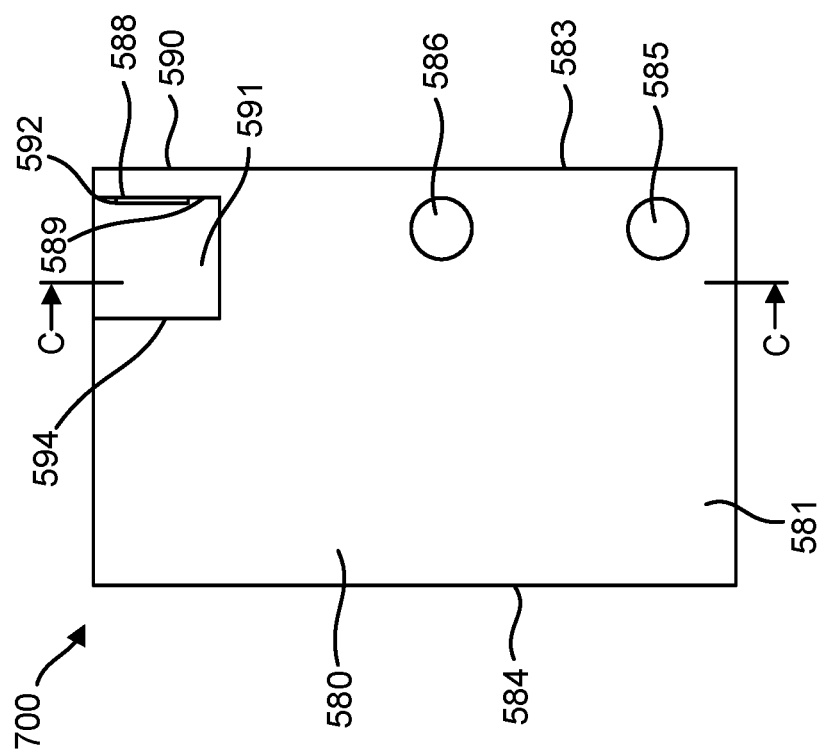
FIG. 7 shows another example print liquid supply cartridge.

FIG. 7 shows another example print liquid supply cartridge 700. In particular, FIG. 7 shows a plan view of the cartridge 700. The example cartridge of FIG. 7 is similar to that of FIG. 5. In the example of FIG. 7, the recess 591 does not extend across the entire width of the front end 581. The recess 591 is delimited by a second wall 594. The recess 591 between the first wall 588 and the second wall 594 may receive an electrical connector of a printer therein to contact the electrical connection pads 592.

Figure 8:
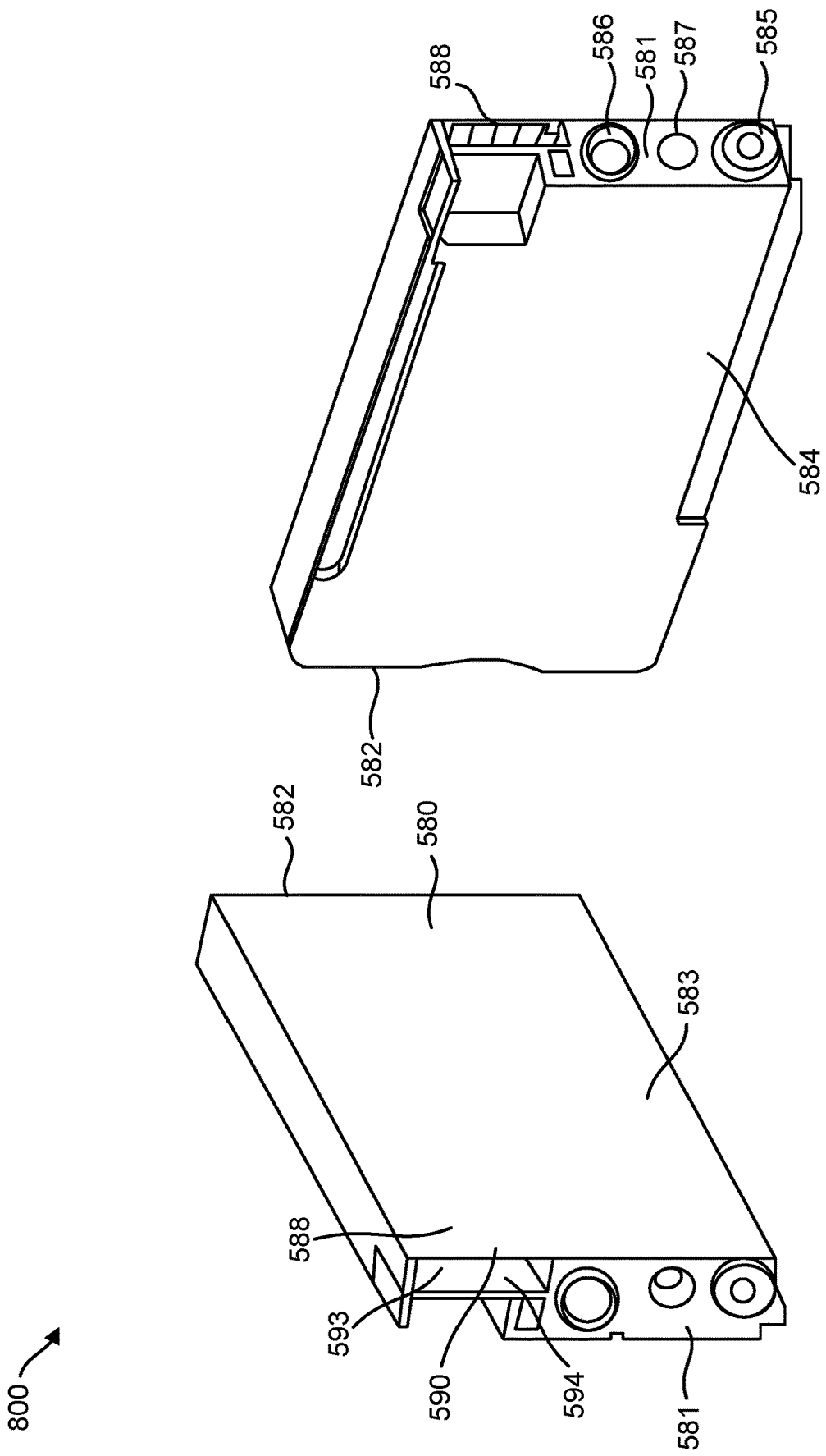
FIGS. 8A and 8B are perspective views of another example print liquid supply cartridge.
Figure 9:
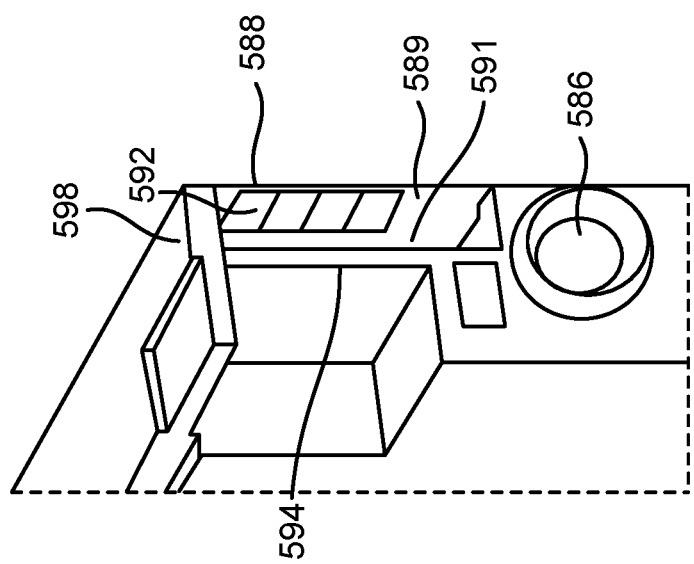
FIG. 9 is a magnified view of part of the example cartridge.

FIGS. 8A and 8B are perspective views of another example print liquid supply cartridge 800. FIG. 9 is a magnified view of part of the example cartridge 800. The same reference numerals are used for like parts. The cartridge 800 has a housing 580 which encloses an internal volume in which the print liquid, such as ink or agent, can be stored. The housing 580 has a front end 581, a rear end 582, and first and second sides 583, 584 extending from the front end to the rear end. A print liquid outlet 585 and a gas inlet 586 may be provided on the front end. The print liquid outlet 585 may be provided closer to the bottom than to the top of the front end 581. The gas inlet 586 may be positioned above the print liquid outlet 585. The front end may also have a print liquid inlet 587 to enable the cartridge to be filled or re-filled with print liquid.

In the example of FIGS. 8A, 8B, and 9, there may be provided a datum surface 593 across the recess from the internal side 589 of the first wall 588. A rib 598 may support the first wall 588. In the example shown, the datum surface is a side of a second wall 594 facing towards the recess 591. The datum surface 593 helps ensure smooth installation and removal of the print liquid supply cartridge to and from a printer.

In some examples, the print liquid supply cartridge 800 may include a conductor or conductors that are situated from an inside to an outside of the print liquid supply cartridge 800. For example, a first conductor may be a serial data line and/or a second conductor may be a clock line. In some examples, a third conductor may be a power line and/or a fourth conductor may be a ground line. In some examples, the conductor or conductors may be coupled to the electrical connection pad or pads 592. The electrical connection pad(s) 592 may be situated in the recess 591.

In some examples, the electrical connection pad(s) 592 and the conductor(s) may be supported by a housing component. For example, the electrical connection pad(s) and the conductor(s) may be supported by a lid described herein. For instance, the electrical connection pad(s) and the conductor(s) may be supported by the first wall 588, which may be a first wall 588 of a lid. In some examples, the print liquid supply cartridge 800 includes a sensor or sensors. In some examples, the sensor(s) may be supported by the lid and/or the first wall 588.

In some examples, the print liquid supply cartridge 800 may include a print liquid interface or interfaces. A print liquid interface is an interface for the passage of print liquid. Examples of a print liquid interface may include the print liquid outlet 585 and the print liquid inlet 587, which may be included in the front end 581 of the print liquid supply cartridge.

The invention claimed is:

1. A print liquid supply unit, comprising:
a regulator assembly comprising an at least partially expandable or contractible pressure chamber;
a port;
sensor circuitry positioned between the regulator assembly and the port in a print liquid reservoir; and
a first conductor and a second conductor, wherein the first conductor is a serial data line and the second conductor is a clock line.

2. The print liquid supply unit of claim 1, further comprising a print liquid inlet and a gas inlet of the print liquid supply unit.

3. The print liquid supply unit of claim 1, further comprising a third conductor and a fourth conductor, wherein the third conductor is a power line and the fourth conductor is a ground line.

4. The print liquid supply unit of claim 1, wherein the sensor circuitry comprises a liquid level sensor.

5. The print liquid supply unit of claim 1, wherein the sensor circuitry comprises strain or pressure sensor.

6. The print liquid supply unit of claim 1, wherein the sensor circuitry is to detect a print liquid level for a portion of a level range of the print liquid reservoir.

7. The print liquid supply unit of claim 1, wherein the sensor circuitry is distanced from the regulator assembly.

8. The print liquid supply unit of claim 1, further comprising a first post and a second post, wherein a sensor support is attached to the first post and the second post.

9. The print liquid supply unit of claim 1, further comprising a first post, a second post, and a third post, wherein the first post, the second post, and the third post are situated in slots of a sensor support.

10. A print liquid supply unit, comprising:
a regulator assembly comprising an at least partially expandable or contractible pressure chamber;
a port;
sensor circuitry positioned between the regulator assembly and the port in a print liquid reservoir;
a valve mechanism to open or close the port; and
a support rib to support the valve mechanism, wherein the support rib comprises a slot, and wherein a portion of the sensor circuitry is situated through the slot.

11. The print liquid supply unit of claim 10, wherein the slot has a shape to create a first capillary force at a first end of the slot that is greater than a second capillary force at a second end of the slot.

12. A print liquid supply unit, comprising:
a regulator assembly comprising an at least partially expandable or contractible pressure chamber;
a port;
sensor circuitry positioned between the regulator assembly and the port in a print liquid reservoir; and
a front end with at least one print liquid interface, a bottom, and a top, wherein the print liquid supply unit comprises a recess in and between the front end and the top, wherein an electrical connection pad is situated in the recess and coupled to the sensor circuitry.

13. The print liquid supply unit of claim 12, wherein the electrical connection pad and a conductor are supported by a lid.

14. The print liquid supply unit of claim 13, wherein the electrical connection pad and the conductor are supported by a same wall of the lid.

15. The print liquid supply unit of claim 13, wherein the sensor circuitry is connected to the conductor, wherein the sensor circuitry is supported by the same wall or the lid.

16. A print liquid container, comprising:
a container wall comprising posts;
a container property sensor including a strain sensor or pressure sensor secured to the container wall with the posts; and
a first conductor and a second conductor, wherein the first conductor is a serial data line and the second conductor is a clock line.

17. The print liquid container of claim 16, wherein the posts are swaged to secure the container property sensor to the container wall.

18. A cartridge, comprising:
a body comprising a print liquid port, wherein a spring is to press a ball into the print liquid port when in a closed position;
a lid comprising a structure to retain the spring and the ball, wherein the structure comprises an opening;
sensor circuitry, wherein a tail of the sensor circuitry is situated in the opening to sense a print liquid level by the print liquid port; and
a first conductor and a second conductor, wherein the first conductor is a serial data line and the second conductor is a clock line.

19. The cartridge of claim 18, wherein the opening has a first dimension that is greater than a second dimension of the opening.

* * * * *